(12) United States Patent
Adey et al.

(10) Patent No.: US 10,029,264 B2
(45) Date of Patent: Jul. 24, 2018

(54) SEPARATOR DEVICE

(71) Applicant: Adey Holdings (2008) Limited, Cheltenham (GB)

(72) Inventors: Christopher Adey, Cheltenham (GB); Matthew Taylor, Cheltenham (GB); Simom Downie, Cheltenham (GB)

(73) Assignee: ADEY HOLDINGS (2008) LIMITED, Cheltenham (GB)

( * ) Notice: Subject to any disclaimer, the term of this patent is extended or adjusted under 35 U.S.C. 154(b) by 289 days.

(21) Appl. No.: 14/402,955

(22) PCT Filed: May 21, 2013

(86) PCT No.: PCT/GB2013/051330
§ 371 (c)(1),
(2) Date: Nov. 21, 2014

(87) PCT Pub. No.: WO2013/175201
PCT Pub. Date: Nov. 28, 2013

(65) Prior Publication Data
US 2015/0151220 A1   Jun. 4, 2015

(30) Foreign Application Priority Data

May 21, 2012   (GB) .................................. 1208917.3
Nov. 2, 2012   (GB) .................................. 1219752.1

(51) Int. Cl.
*B04C 5/14*   (2006.01)
*B01D 21/26*   (2006.01)
(Continued)

(52) U.S. Cl.
CPC ............ *B04C 5/14* (2013.01); *B01D 21/0009* (2013.01); *B01D 21/2411* (2013.01);
(Continued)

(58) Field of Classification Search
CPC ....... B04C 5/14; B01D 21/26; B01D 21/2411; B01D 35/303; B01D 29/908; B01D 21/267; B01D 2201/302; B01D 21/0042
See application file for complete search history.

(56) References Cited

U.S. PATENT DOCUMENTS

| | | |
|---|---|---|
| 3,339,740 A | 9/1967 | Starzyk |
| 3,696,927 A | 10/1972 | Jakobsson et al. |

(Continued)

FOREIGN PATENT DOCUMENTS

| | | |
|---|---|---|
| CN | 101967018 A | 2/2011 |
| GB | 737822 A | 10/1955 |

(Continued)

OTHER PUBLICATIONS

The Chapter II International Preliminary Report on Patentability for PCT/GB2013/051330, dated Oct. 9, 2014.*

(Continued)

*Primary Examiner* — David A Reifsnyder
(74) *Attorney, Agent, or Firm* — Michael E. Dockins; Shumaker, Loop & Kendrick, LLP

(57) ABSTRACT

A separator device for removing particles from suspension in a liquid includes a housing having first and second chambers with apertures for ingress and egress of liquid into the first chamber. Means are provided for setting up a swirl of liquid within the first chamber. Apertures enable flow of liquid between the first chamber and the second chamber. Means are also provided for setting up a swirl of liquid within the second chamber. The swirl in the second chamber is in substantially the opposite direction to the swirl in the first chamber, and there is no substantial flow in the second chamber which is in the same direction as the swirl in the first chamber.

21 Claims, 12 Drawing Sheets

(51) Int. Cl.
  *B01D 21/24* (2006.01)
  *B01D 35/30* (2006.01)
  *B01D 29/90* (2006.01)
  *B01D 21/00* (2006.01)
  *B03C 1/28* (2006.01)
  *B01D 35/06* (2006.01)
  *B21D 39/04* (2006.01)
  *B03C 1/0355* (2006.01)
  *F17D 3/16* (2006.01)
  *F24D 19/00* (2006.01)
  *B04C 3/06* (2006.01)
  *B04C 5/185* (2006.01)
  *E03B 7/07* (2006.01)
  *B03C 1/14* (2006.01)
  *B03C 1/30* (2006.01)
  *C02F 1/48* (2006.01)
  *F16L 21/00* (2006.01)
  *F16L 29/00* (2006.01)
  *B03C 1/02* (2006.01)
  *C02F 101/20* (2006.01)
  *F16L 55/24* (2006.01)

(52) U.S. Cl.
  CPC ......... *B01D 21/2483* (2013.01); *B01D 21/26* (2013.01); *B01D 21/267* (2013.01); *B01D 29/908* (2013.01); *B01D 35/06* (2013.01); *B01D 35/303* (2013.01); *B03C 1/02* (2013.01); *B03C 1/0355* (2013.01); *B03C 1/14* (2013.01); *B03C 1/286* (2013.01); *B03C 1/288* (2013.01); *B03C 1/30* (2013.01); *B04C 3/06* (2013.01); *B04C 5/185* (2013.01); *B21D 39/044* (2013.01); *C02F 1/488* (2013.01); *E03B 7/074* (2013.01); *F16L 21/00* (2013.01); *F16L 29/007* (2013.01); *F17D 3/16* (2013.01); *F24D 19/0092* (2013.01); *B01D 21/0042* (2013.01); *B01D 2201/302* (2013.01); *B01D 2201/4023* (2013.01); *B01D 2221/02* (2013.01); *B03C 2201/18* (2013.01); *B03C 2201/20* (2013.01); *B03C 2201/28* (2013.01); *C02F 2101/203* (2013.01); *C02F 2201/48* (2013.01); *C02F 2303/22* (2013.01); *F16L 55/24* (2013.01); *Y10T 137/794* (2015.04)

(56) References Cited

U.S. PATENT DOCUMENTS

| | | |
|---|---|---|
| 4,544,483 A | 10/1985 | Arvai |
| 5,257,525 A | 11/1993 | Clarke |

FOREIGN PATENT DOCUMENTS

| | | |
|---|---|---|
| GB | 2486172 A | 6/2012 |
| GB | 2486173 A | 6/2012 |
| SU | 483819 A3 | 9/1975 |
| SU | 940863 A1 | 7/1982 |
| WO | 8402855 A1 | 8/1984 |
| WO | 9942198 A1 | 8/1999 |
| WO | 2012073029 A1 | 6/2012 |
| WO | 2012073031 A1 | 6/2012 |

OTHER PUBLICATIONS

Australian examination report dated Feb. 22, 201.
Chinese first office action (full translation).
Chinese second office action (full translation).
Extended European search report dated Jul. 17th, 2015.
British search report dated Feb. 26th, 2013.
British further search report dated May 1st, 2013.
Second British further search report, also dated May 1st, 2013.
Translation of Russian office action including search report dated Apr. 6th, 2017.
New Zealand first examination report dated Sep. 15th, 2015.

* cited by examiner

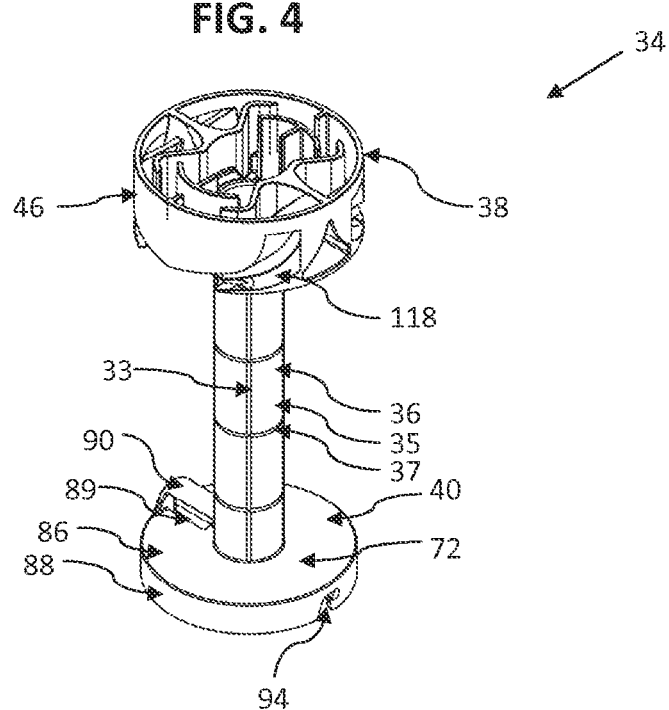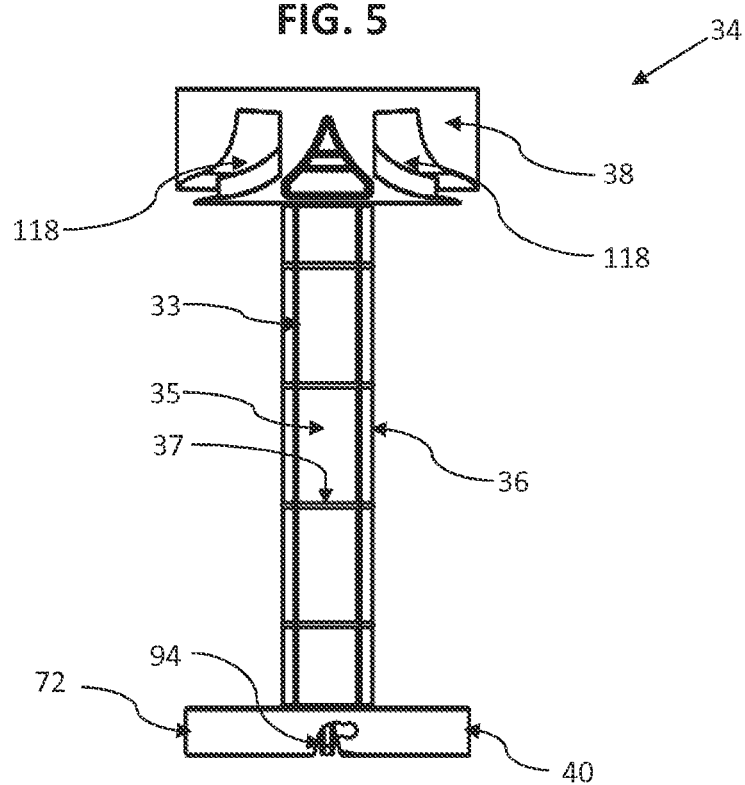

SEPARATOR DEVICE

CROSS-REFERENCE TO RELATED APPLICATIONS

This application is a National Stage of International Application No. PCT/GB2013/051330, filed May 21, 2013, which claims priority to GB 1219752.1, filed Nov. 2, 2012, which in turn claims priority to GB 1208917.3, filed May 21, 2012. The entire disclosures of the above applications are hereby incorporated herein by reference.

FIELD

The present invention relates to a separator device suitable for separating particles from a fluid flow and particularly but not exclusively to a separator device for use in a hydronic heating system.

BACKGROUND

In a typical heating system, water is circulated by a pump through several radiators, possibly a heat exchanger in a hot water cylinder, and a boiler. During circulation, solid particles (for example, iron oxide) which have come loose from the interior of the radiators and pipework can become suspended in the water. Solid particles can also be present as contaminants in the water originally supplied to the system, and the water can become contaminated by dirt where an open expansion tank forms part of the system. These solid particles can cause malfunction if they build up in the boiler or pump, and reduce the effectiveness of the heating system by restricting the flow of water and clogging radiators. The water in a heating system should therefore be continually cleaned to remove solid particles as far as possible.

Various devices are known for removing particles from suspension in a flow of water. Typically these devices include a magnet for attracting ferrous particles, and may also include mechanical separation means for removing nonmagnetic particles. Nonmagnetic particles may be removed by causing a portion of the water to flow through a separation chamber, within which obstruction means are disposed to slow the flow. Particles will then fall out of suspension and become trapped in cavities, which can easily be cleaned during an annual service. Only a portion of the flow is slowed, so that the drop in fluid pressure across the device is minimized. Devices of this type are disclosed in the applicant's applications GB2486173 and GB2486172.

Known devices are designed to produce a slow flow rate in the separation chamber, whilst causing a minimal drop in fluid pressure across the unit. It is advantageous to produce separator devices which are small in size to enable them to be fitted in small spaces. This requires that the separator chamber must in turn be small in size, and the obstruction means disposed therein have a consequently limited ability to substantially slow the flow rate of fluid within. Since it is undesirable to place obstruction means outside of the separation chamber, due to the resultant pressure drop, there is a limit on the overall separation effectiveness of known devices.

When a heating system is serviced, the separator device must be cleaned to remove the particles which have been separated from the fluid. A removable screw-top is typically provided at the upper end of the cylindrical housing which, when removed, allows access to the inside of cylindrical housing. A removable insert is typically provided within the housing, which must be removed for cleaning.

The removable insert is typically of similar longitudinal extent to the cylindrical housing. Therefore to allow the insert to be removed from the housing, the separator device must be installed where there is a vertical space between horizontal surfaces of at least twice the height of the housing. This requirement imposes an unwelcome constraint on the installer in terms of where the device may be installed, particularly where the separator device is being retrofitted to an existing installation. For example, there is often insufficient space between the bottom of a boiler and a counter top. In some cases it may simply not be possible to fit a device of suitable capacity which requires such a large vertical space.

Separator devices are often fitted to a heating circuit via right-angle connectors which link the inlet and outlet of the device to pipework. The right-angle connectors may be installed on open ends of the pipework, and the separator device can then be pushed on to the right-angle connectors. However, cutting the pipe in exactly the right place and installing the right-angle connectors so that they correspond precisely with the inlet and outlet of the device is difficult to achieve. An installer may be tempted to attach the right-angle connectors to the separator device, afterwards screwing the connectors onto the pipework. However, there is a serious risk of damaging the separator device in this method, since the torque of a spanner on a right-angle connector may be sufficient to break an inlet or outlet port from the separator.

SUMMARY

It is an object of this invention to provide a separator device which reduces or substantially obviates the above mentioned problems.

According to a first aspect of the present invention, there is provided a separator device for removing particles from suspension in a liquid comprising: a housing, having a first chamber and a second chamber; apertures in the housing allowing ingress and egress of liquid into the first chamber; means for setting up a swirl of liquid within the first chamber; apertures enabling flow of liquid between the first chamber and the second chamber; means for directing a flow of liquid within the second chamber, the net flow in the second chamber being in substantially the opposite direction to the swirl in the first chamber.

The flow of liquid in the second chamber may be a swirl in substantially the opposite direction to the swirl in the first chamber. That is, means may be provided for setting up a swirl in the second chamber.

Baffles or other obstruction means may be provided within the second chamber to slow the flow of liquid within the second chamber. Reversing the flow of fluid so that the fluid flows in the first and second chambers are counter-rotating serves to further reduce the flow rate in the second chamber, whilst ensuring that the overall pressure drop across the device is minimized. This increases the effectiveness with which small solid particles may be separated from the liquid.

A third chamber may be provided, being apertured for ingress and egress of fluid from at least one of the first chamber and the second chamber, and means being provided for directing a flow in the third chamber. The means for directing a flow may set up a swirl in the third chamber. The flow in the third chamber may be in substantially the same direction as the flow in the second chamber, and the first chamber may be disposed between the second and third chambers. To achieve counter-rotating flows in the chambers, the flow may be reversed when it passes from the first chamber to the second chamber and, where a third chamber is provided, flow may be reversed where it passes from the first chamber to the third chamber.

Providing a third chamber allows two chambers to act as separating chambers, with obstruction means being provided to slow the flow. The remaining chamber may maintain a substantially unobstructed swirling flow of fluid between the inlet and the outlet, and may contain a sleeved magnet providing separation of magnetic particles in the swirling flow. Providing two separating chambers increases the overall effectiveness of the device, since more particles will be separated from the liquid. In particular, positioning chambers near both top and bottom ends of a separator device, with the first unobstructed chamber in the center, ensures that effective separation is achieved wherever the inlet to the device is located, allowing the apertures in the housing to be used as inlet and outlet either way around, affording flexibility to the installer. Where three chambers are provided, it is preferable that flow in the separating chambers is in the opposite direction to the swirl in the unobstructed first chamber, as reversing the direction of flow on entry to the or each separation chamber assists in slowing the flow within the separation chamber(s).

The construction of a device with three chambers may conveniently be such that the first, second and third chambers share a single central axis. The central axis may be oriented vertically in use, so that the second and third chambers are at the top and bottom of the device.

The means for directing flow or setting up a swirl within at least one of the chambers may be formed integrally with a wall or other barrier separating that chamber from another chamber. By integrally forming means for directing flow with the apertures, the construction of the device is simplified.

The means for directing flow of liquid within at least one of the chambers may comprise apertures in the chamber having the form of curved slots.

Curved slots are advantageous since they may be positioned to deflect a flow of liquid into a separating chamber, and also to reverse the direction of the liquid flow.

The means for setting up a swirl of liquid within at least one of the chambers may comprise of at least one flow guide extending from a wall of the chamber, adjacent to at least one aperture in the chamber wall. The flow guide or guides may form an angled deflector overhanging each aperture, and may extend below the chamber wall, into the chamber in which swirl is being set up.

Opposing flows or swirls of liquid may be set up in at least one of the second chamber and, where provided, the third chamber. This may be achieved by reversing the flow as it passes between the first chamber and the second or third chamber, and reversing the flow again within the second or third chamber.

According to a second aspect of the invention, a separator device for removing particles from suspension in a liquid comprises: a housing, having a first chamber and a second chamber; apertures in the housing for allowing ingress and egress of liquid into the first chamber; means for setting up a swirl of liquid within the first chamber; apertures enabling flow of liquid between the first chamber and the second chamber; the direction of liquid flow being substantially reversed as liquid enters the second chamber, and at least a portion of flow being substantially reversed again within the second chamber.

Repeated reversing of flow increases the effectiveness with which nonmagnetic particles are removed from the liquid.

Preferable and/or optional features of the second aspect of the invention are set forth in the claims.

According to a third aspect of the invention, there is provided a release tool for releasing connectors on the inlet and outlet of a separator device, the release tool having first and second bearing areas for bearing against the inlet and outlet connectors, and a handle region for enabling force to be applied, via the bearing areas, to both connectors simultaneously.

The handle may be provided between the bearing areas, for providing an even force on both bearing areas.

Providing a release tool allows for easy removal of a separator device from a heating circuit. This provides additional flexibility when choosing a location for the device since space does not need to be allowed for disassembling the device in situ, service and cleaning being possible when the device is removed from the heating circuit.

A locking member may be provided to one side of the handle region, which in use blocks movement of the handle region and prevents operation of the release lever. The extent of the locking member from the handle region may be adjustable.

A locking member serves to prevent accidental release of the device from the heating circuit. Such accidental release would be highly undesirable since a large amount of dirty water may be released from the heating circuit, causing damage to property.

The extent of the locking member from the handle region may be adjustable by means of a screw thread. A screw thread provides a convenient adjustment means, allowing the locking member to be screwed securely against the body of the connected device when required.

A raised area may be provided on each bearing area. The raised areas may be provided on an outer side of each bearing area, that is, around the point on the bearing area which is most distant from the central handle region. The raised areas ensure that the release tool provides an even force across opposing sides of the connectors on the separator device.

The release tool may be made from a material which is to some extent elastically deformable, for example, hard plastics. As force is applied to the handle region, the release tool may deform slightly, the sides of the bearing areas closest to the handle portion forming a pivot against the connectors of the separator device, and the distal sides of the bearing areas coming away from the connector. The raised areas compensate for this.

A wall may extend perpendicularly from at least part of the edge of at least one of the bearing areas. In use, the wall forms a guide area around the inlet and outlet of the separator device. The wall also extends around and obstructs access to the release mechanism, limiting the possibility of accidental release while the device is locked. The wall also keeps dirt from entering the fitting mechanism, which otherwise might cause malfunction or leakage in the connectors.

According to a fourth aspect of the present invention, there is provided a separator device for use with a release tool, the separator device including: a housing, having a curved outer surface and a central longitudinal axis; an inlet and an outlet extending perpendicularly from the curved outer surface of the housing, the inlet and the outlet being centrally disposed on an axis, the axis running parallel to the central longitudinal axis of the housing; and an extension from the curved outer surface of the housing, between the inlet and the outlet, the extension forming a raised and substantially flat surface in a plane parallel with the central longitudinal axis, for bearing against a locking member of a release tool.

The raised flat surface may be in a plane parallel with the central longitudinal axis, and also parallel with a tangent of the curved outer surface.

The raised flat surface formed by the extension provides a flat bearing surface for the locking member of the release tool of the third aspect of the invention. A locking member bearing against a curved surface would have a small contact area, and hence exert considerable pressure on the curved housing, risking damage. Providing a flat bearing surface increases the contact area, reduces the pressure, and limits the possibility of the housing being damaged by a locking member.

The raised flat surface may be embossed with quality control and other markings. Nevertheless, the surface is substantially flat.

The inlet and outlet may include releasable connectors for securing the inlet and outlet of the separator to pipes. The releasable connectors may be releasable by means of a collet surrounding the entrance to each of the inlet and outlet, the connectors releasing when the collets are pushed inwardly, towards the body of the separator device. For example, the connectors may be John Guest® Speedfit® connectors.

According to a fifth aspect of the present invention, there is provided a jig for positioning first and second valves, the valves being rotatable relative to one another and each having a pipe portion extending from one side thereof, the jig comprising a body, two parallel circular apertures passing through the body for engaging with and positioning the pipe portions in a fixed position relative to one another, each of the two parallel circular apertures having a central axis, the central axes of the apertures being along two parallel lines, and each aperture contacting a respective pipe portion in at least two positions along its length, for accurately positioning the axis of each pipe portion.

The jig holds two pipe portions in a parallel arrangement, side-by-side. The pipe portions are also held a fixed distance apart.

The jig may form part of a jig assembly, comprising the jig, and first and second valves having pipe portions extending therefrom. The parallel apertures of the jig may be clearance fits for the pipe portions.

DRAWINGS

For a better understanding of the present invention, and to show more clearly how it may be carried into effect, reference will now be made, by way of example only, to the accompanying drawings, in which:

FIG. 4 shows a perspective view of an insert, being a component part of the separator device of FIG. 1;

FIG. 5 shows a front view of the insert of FIG. 4;

DETAILED DESCRIPTION

Figure 1:
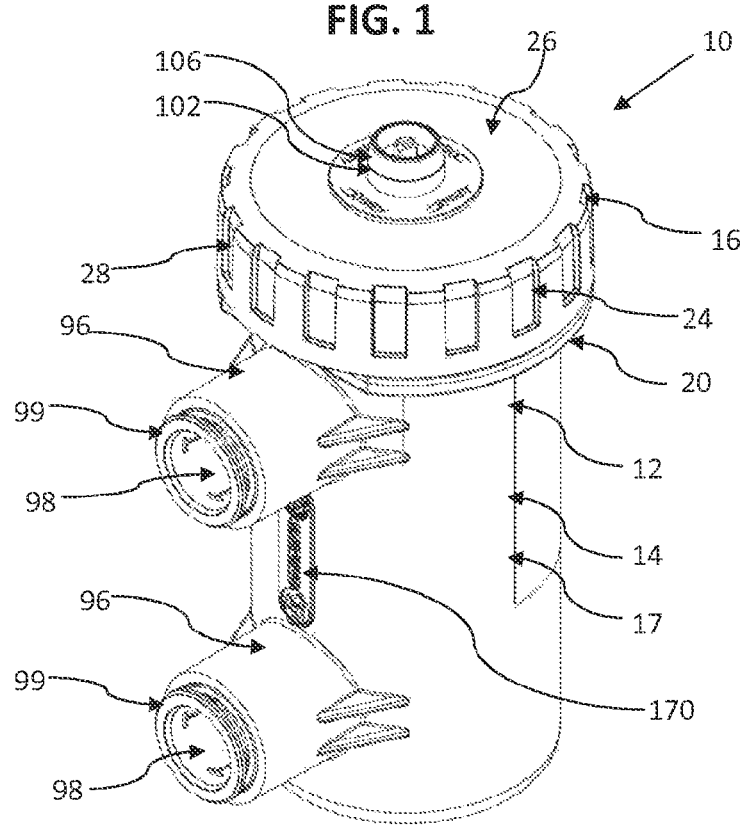
FIG. 1 shows a perspective view of a separator device according to the first and second aspects of the invention.
Figure 2:
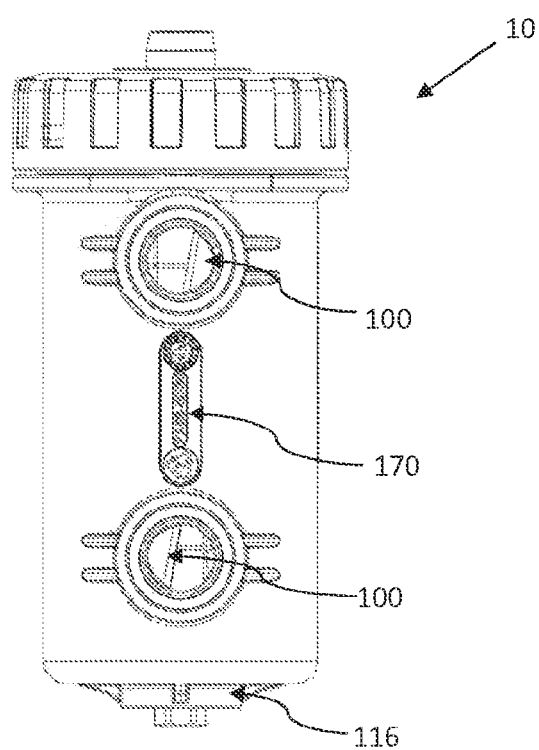
FIG. 2 shows a front view of the separator device of FIG. 1.
Figure 3:
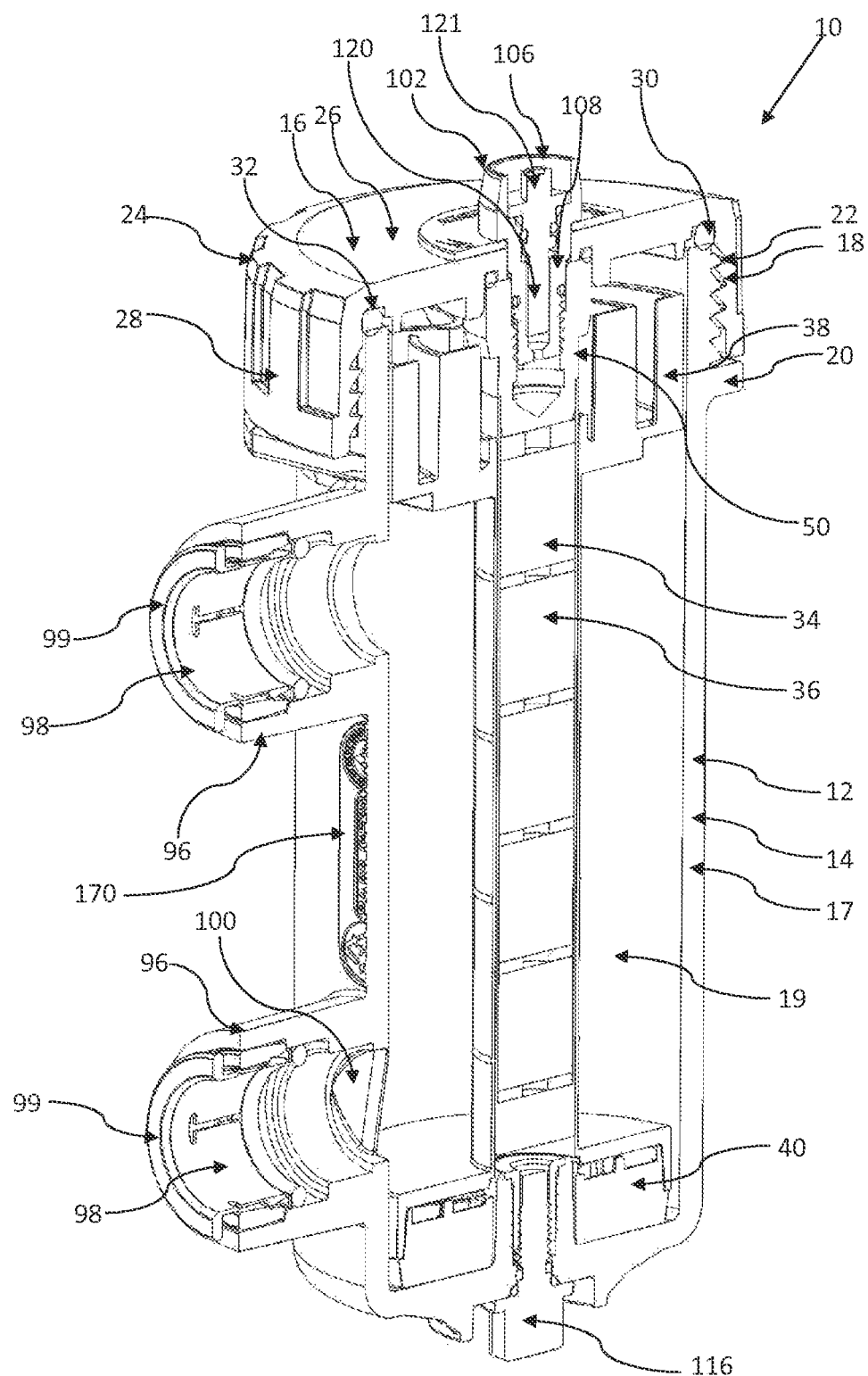
FIG. 3 shows a perspective cut-away view of the separator device of FIG. 1.

Referring firstly to FIGS. 1 to 3, a separator device for separating particles from suspension in a fluid is indicated generally at 10. A housing 12 is provided, comprising of a body portion 14 and a removable closure portion 16. The body portion is substantially a cylindrical shell open at the upper end, that is, the body portion 14 comprises a floor and a wall 17, and defines a main chamber 19. The upper end of the wall 17 of the body portion 14 is formed with a male thread 18 and, directly below the male thread, a circumferential rim 20.

The closure portion 16 is in the form of a screw-on cap comprising a circular planar roof 26 and a circumferential wall 28 extending below the edge of the roof. A thread 22 is formed on the interior surface of the wall 28, for co-operating with the male thread 18 at the upper end of the wall 17 of the housing body portion 14. A plurality of recesses 24 are provided spaced uniformly around the outside of the wall 28 of the closure portion 16 in order to assist a user in gripping the closure portion 16 to effect closure and removal.

A recess 30 is provided around the edge of the underside of the roof 26 of the closure portion 16. A rubber O-ring 32 sits within the recess 30, around half of the height of the O-ring 32 extending below the underside of the roof 26. When the closure portion 16 is screwed onto the body portion 14 of the housing 12, the O-ring 32 is compressed between the roof 26 of the closure portion 16 and the upper edge of the wall 17 of the housing body portion 14, forming a watertight seal.

An inlet and an outlet are provided as first and second hollow cylindrical sockets 96 in the wall 17 of the housing body 14, each extending perpendicular to the same tangent of the cylindrical body, that is, the sockets extend outwardly from the wall of the housing 14 and are parallel to each other on a diameter of the housing 12. John Guest® Speedfit® connectors 98 are provided within the sockets 96, allowing easy fitting to a heating circuit. The sockets 96 receive sections of pipe, and the John Guest® Speedfit® connectors 98 grip the pipe sections and form a sealed connection. The John Guest® Speedfit® connectors 98 include collets 99 which, when pushed inwardly towards the housing body, release the grip on the pipe, allowing removal. The John Guest® Speedfit® connectors allow for easy fitting and removal of the separator device 10 from a heating circuit.

The parallel inlet and outlet sockets 96 are aligned on the same radial plane and enable easy fitting to a heating circuit, since the inlet and outlet will be in the same straight pipe line when the device is installed.

A flat raised section 170 is provided on the curved surface of the housing body 14, between the inlet and outlet 96.

Deflectors 100, best shown in FIG. 2, are provided within each of the sockets 96 in the cylindrical housing 12. The deflectors 100 block a portion of each socket 96, directing the flow on the inlet to one side and resulting in a swirling flow within the main chamber 19. The edges of the deflectors 100 are at an angle of around 10° from the vertical, so as to divert water slightly vertically as well as horizontally. Providing deflectors 100 in both sockets 96 allows either to be used as the inlet, affording additional flexibility to the installer.

A bleed valve assembly 102 is provided through the center of the screw-on cap 16 and is screwed into a plug 50 within the housing 12. The bleed valve assembly includes a head portion 106 and a body portion 108, the head portion 106 being of greater diameter than the body portion 108, so that the body portion 108 but not the head portion 106 will fit through a circular aperture in the center of the roof 26 of the closure portion 16 of the housing 12. A passage 120 is provided through the center of the head and body portions 106, 108 and a screw-in bleed valve 121 screws into and seals the passage 120.

A drain valve 116 comprising of a screw-in plug with seal is provided in the floor of the housing body 14.

When the heating system is serviced, the separator device 10 is isolated from the heating circuit, and the bleed valve 121 and drain valve 116 are opened to drain fluid from the housing 12. The drain valve 116 is then closed, and the system can be dosed with a corrosion inhibitor via the bleed valve passage 120. A supply line can be secured onto the thread of the head portion. The separator device 10 is then reconnected to the heating circuit, air being forced out of the bleed valve 102. When all the air has been removed the bleed valve 121 is closed, and the system refilled and/or re-pressurized as necessary.

Referring now to FIGS. 4 to 8, an insert 34 is removably contained within the housing 12. The insert comprises a central section 36 formed as a hollow cylinder, a first separation chamber 38 at an upper end of the insert and a second separation chamber 40 at a lower end of the insert, as viewed and installed in the housing. The upper and lower separation chambers 38, 40 are substantially cylindrical and share a central axis with the central section 36. The upper and lower separation chambers 38, 40 are sized to almost completely extend to the full interior diameter of the housing body 14.

The hollow cylindrical central section 36 has a curved wall which is approximately 0.65 mm thick. Four equally spaced reinforcing ribs 37 are provided, each around the circumference of the outer surface of the cylindrical central section 36. Four equally spaced reinforcing spines 33 are provided perpendicular to the ribs 37. The ribs 37 and spines 33 define rectangular panels 35.

A cylindrical magnet is provided inside the hollow central section 36 of the insert 34, the central section forming a sheath around the magnet. In use, the magnet attracts ferrous particles from the swirling flow of the liquid in the main chamber 19, the ferrous particles collecting in the panels 35 on the outer surface of the central sheath section 36 of the insert 34. When the heating system is serviced, the insert 34 may be removed from the housing 12, and the magnet removed from within the central sheath section 36. With the magnet removed, ferrous particles will easily fall away for disposal.

The ribs and spines are required because the wall of the central section 36 is thin, to improve the effect of the magnet on the flow.

The upper separation chamber 38 is formed as a cylindrical shell with an open top end, that is, a circular tray having a floor 44 and a single curved wall 46. The floor 44 has a circular aperture at its center which has the same interior diameter as the hollow central section 36 of the sheath 34. Within the upper separation chamber 38, protrusions 48 extend from the floor 44, the protrusions 48 having a vertical extent matching the vertical extent of the wall 46. The protrusions 48 form interior walls which define passageways within the upper separation chamber 38.

Figure 6:
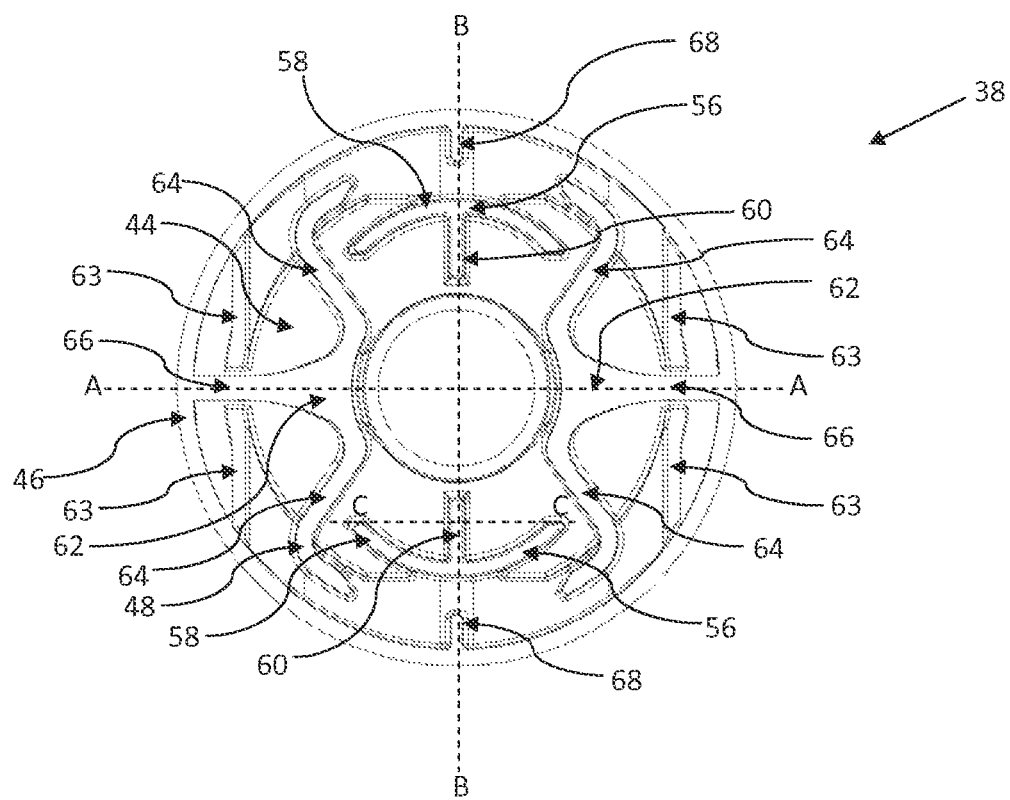
FIG. 6 shows a plan view from above of the insert of FIG. 4.
Figure 13:
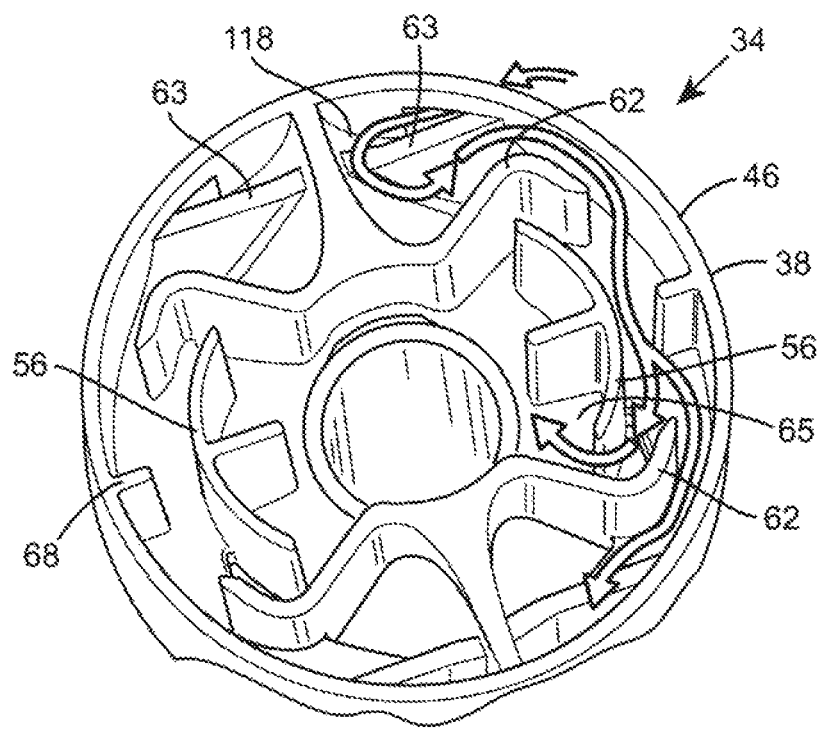
FIG. 13 shows a partial perspective view of the top part of the insert of FIG. 4.

The arrangement of the protrusions 48 is best shown in FIGS. 6 and 13. The arrangement is reflectively symmetrical about two orthogonal axes A-A, B-B. Two protrusions of a first type 56 face each other. The protrusions of the first type 56 are formed of a curved wall 58 comprising substantially 90° of a circle arc, with a radius of curvature slightly smaller than the radius of the upper separation chamber 38, and a straight wall 60 extending inwardly from the center of the curved wall 58 towards the center of the chamber 38. Approximately one third of the length of the straight wall 60 extends beyond a straight line C-C between the ends of the curved section 58. The concave faces of the curved walls 58 face each other.

The protrusions of the first type 56 are positioned with the straight wall 60 on a diameter B-B of the upper separation chamber 38, and so that the curved wall 58 does not touch the wall 46 of the upper separation chamber 38, enabling water to flow around all sides of the protrusions 56.

Two protrusions of a second type 62 face each other at 90° to the protrusions of the first type 56. The protrusions of the second type 62 each comprise a stem 66 extending from the wall 46 of the upper separation chamber 38 towards the center of the chamber 38, and two hook-shaped walls 64. The stem 66 widens as it approaches the center of the upper separation chamber 38, where the stem 66 meets the surface of the plug 50, curving around the surface of the plug. The hook-shaped walls 64 extend from either side of the stem 66 where it meets the plug 50, at an angle of around 55' from the stem, so that the hook-shaped walls 64 curve back towards the outside wall 46 of the upper separation chamber 38. Before the hook-shaped walls 64 meet the wall 46 of the upper separation chamber 38, they curve around 90° in the direction away from the stem 66, forming a hooked end. The extent of the hook after the 90° curve is substantially half of the extent of the hook before the curve.

The stems 66 of the protrusions of the second type 62 together with the plug 50 form a wall extending across diameter A-A of the upper separation chamber 38 and dividing the upper separation chamber 38 into two halves. The upper separation chamber 38 is reflectively symmetrical about diameters A-A and B-B, and is also rotationally symmetrical about its center.

Two straight protrusions 68, having similar vertical extent to the above mentioned protrusions 56, 62 and to the wall 46 of the upper separation chamber 38, are disposed adjacent to the wall 46 on the diameter B-B of the upper separation chamber 38, projecting inwardly towards the center of the upper separation chamber 38.

Four slots 118 are provided in the upper separation chamber 38, one of which is best shown in FIG. 4. The slots 118 guide flow upwardly into the first separation chamber 38, in opposing arcuate directions, and extend through the side wall 46. That is, two guide flow upwardly in one arcuate direction, and the other two in the opposing direction, for guiding flow into the upper separation chamber 38 irrespective of the direction of swirl within the main chamber 19.

Two straight protrusions 63, having slightly shorter vertical extent than the wall 46 of the upper separation chamber 38, are disposed on each of two chords of the circular chamber 38, each protrusion 63 forming a wall separating the arcuate slots 118 in the wall 46 from the rest of the upper separation chamber 38.

In use, liquid flows into the upper separation chamber 38 via arcuate slots 118. The liquid changes direction when it hits the stem 66 of the protrusions of the second type 62, and then flows over the top of the straight protrusions 63. The flow continues between and around protrusions 56, 62, 68. The liquid flow is slowed by the obstruction of the protrusions 56, 62, 68, and in particular is slowed when it flows between the protrusion of the first type 56 and the protrusion of the second type 62, again changing direction in the area indicated at 65 in FIG. 13. Arrows in FIG. 13 show the liquid flow through the upper separation chamber 38.

Flow entering the upper separation chamber 38 via a particular arcuate slot 118 will swirl around one half of the circular upper separation chamber 38, exiting the upper separation chamber 38 via the slot 118 which is substantially opposite the entry point, but on the same side of the dividing wall defined by the stems 66 of the protrusions of the second type 62 on axis A-A. Depending on the rotational position of the insert within the housing, and in particular the positioning of the arcuate slots 118 with respect to the inlet and outlet sockets 96, there may be a far greater flow through one side of the upper separation chamber than through the other side.

A portion of flow in the housing is thus guided into the upper separation chamber 38, where it is very substantially slowed. This is done without causing a significant obstruction in the main chamber 19 between the inlet and outlet of the device. The net flow of liquid through the chamber is indicated by the arrow in FIG. 13, although it is appreciated that eddies and reverse flows will be present due to the obstruction means.

Figure 7:
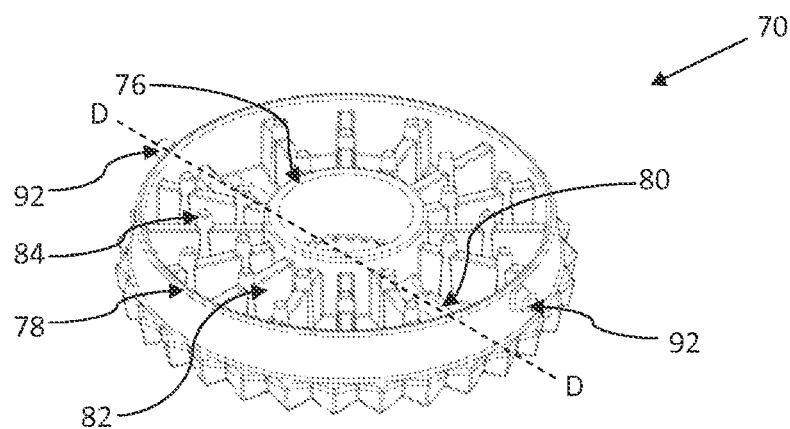
FIG. 7 shows a perspective view of a tray, being a component part of a separator chamber which in turn is a part of the separator device of FIG. 1.
Figure 8:
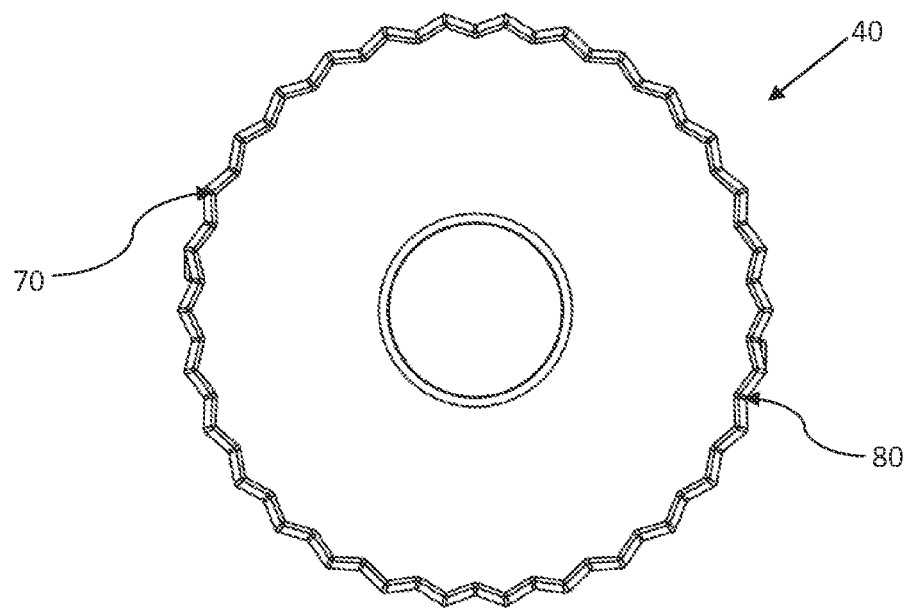
FIG. 8 shows a plan view from below of the tray of FIG. 7.

The lower separation chamber 40 is formed as a tray 70, best seen in FIG. 7, which is detachable from a lid 72. The lid 72 is an integral part of the removable insert 34. The tray 70 is substantially toroidal with an inner wall 76, an outer wall 78 and a floor 80. The tray 70 has an outer diameter just less than the interior diameter of the housing body 14 and an inner diameter substantially matching the external diameter of the central section 36 of the removable insert 34.

A plurality of planar walls 82 extend from the tray floor 80, each wall 82 joining the outer tray wall 78 to the inner tray wall 76, and each having a vertical extent just less than the vertical extent of the tray walls 76, 78, so that water can flow over, but not under or around the planar walls 82. The planar walls 82 are fourteen in number, and are spaced evenly around the toroidal tray 70 at sixteenths of its circumference, two sixteenths being without walls 82, those two sixteenths being opposite each other and the arrangement of walls 82 being reflectively and rotationally symmetrical about a diameter D-D upon which the sixteenths without planar walls 82 lie. Thus the planar walls 82 are arranged in two sections, each section having seven walls 82.

Substantially cylindrical protrusions 84 extend from the tray floor 80 and are coincident with the planar walls 82, so that that the cylindrical protrusions 84 extend through and above the substantially planar walls 82. The planar walls 82 at the ends of the sections are coincident with two cylindrical protrusions 84, as is every second wall 82 in each section, the remaining planar walls 82 being coincident with a single cylindrical protrusion 84. Where a planar wall 82 has a single cylindrical protrusion 84, the cylindrical protrusion 84 is at the center of the wall 82, equidistant from the inner and outer walls 76, 78 of the toroidal tray. Where a wall 82 has two cylindrical protrusions 84, the distance between a first cylindrical protrusion and the outer tray wall 78 is equal to the distance between a second cylindrical protrusion and the inner tray wall 76. Each aforementioned distance is approximately one quarter of the distance between the inner and outer walls 76, 78.

The lid 72 of the lower separation chamber 40 is formed as an annular roof 86 surrounding the central section 36 of the insert 34, with a wall 88 extending below the edge of the roof 86. The interior diameter of the lid 72 is substantially matching the exterior diameter of the tray 70 of the lower separation chamber so that the lid 72 fits over the tray 70.

Apertures 89 are provided in the roof 86 of the lid 72 at either side of a radius, and are formed as two elongate rectangles, each with a longitudinal extent just less than the distance between the inner and outer sides of the annular roof 86, and the longitudinal axes of each being parallel with each other. The two rectangular apertures 89 are together reflectively symmetrical about a radial axis halfway between the apertures.

A flow guide 90 extends upwardly from the upper surface of the roof 86 of the lid 72, on the radial axis of symmetry between the apertures, thus forming a wall between the apertures. The flow guide 90 becomes wider as it extends upwards, so that it forms a curved deflector adjacent to and overhanging each aperture.

Figure 14:
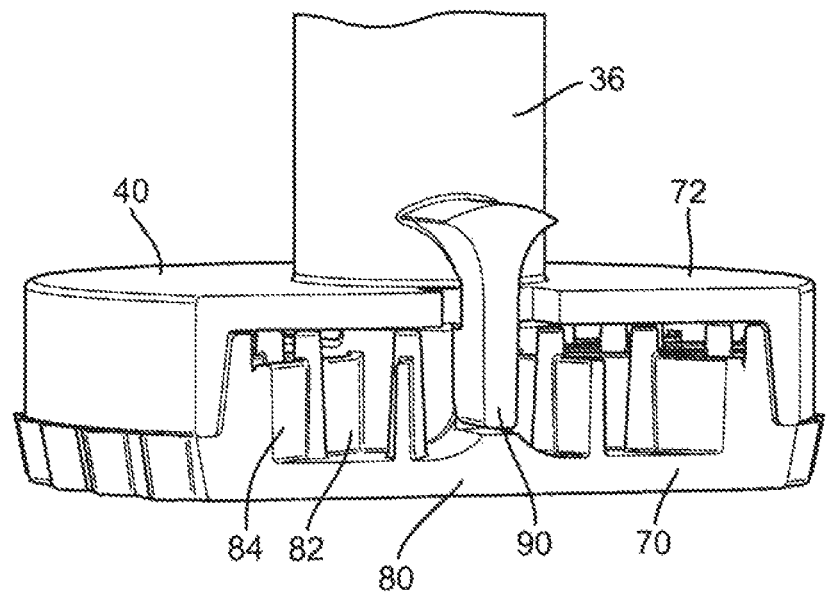
FIG. 14 shows a cut-away perspective view of the insert of FIG. 4 and the tray of FIG. 7.

The flow guide 90 also extends downwardly from the roof 86 of the lid 72, almost meeting the floor 80 of the lower separation chamber 40, as shown in FIG. 14. The flow guide 90 therefore deflects a portion of the swirling flow downwards into the lower separation chamber 40, and reverses the direction of swirl in the lower separation chamber 40, irrespective of the direction of swirl within the housing 12.

At the same time as the liquid is deflected downwards by the flow guide, the horizontal direction of the liquid flow is substantially reversed. This serves to decrease the flow rate within the lower separation chamber 40, increasing the effectiveness of separation.

On the diameter D-D of the tray 70 which forms the space between the two sections of seven planar walls 82, two cylindrical pins 92 are provided near the top of the outer wall 78, extending outwardly from the outer wall 78. Co-operating slots 94 are provided in the walls 88 of the lid 72 extending vertically from the base of the lid wall and then laterally. In use, the tray 70 is slotted onto the lid 72 and then rotated to lock the tray 70 to the lid 72, in the manner of a bayonet connector.

The separator device shown in the Figures and described above provides for three counter-rotating flows. Eddies and reverse swirls could occur in any one of the chambers, but the overall flow direction is as indicated.

Figure 9:
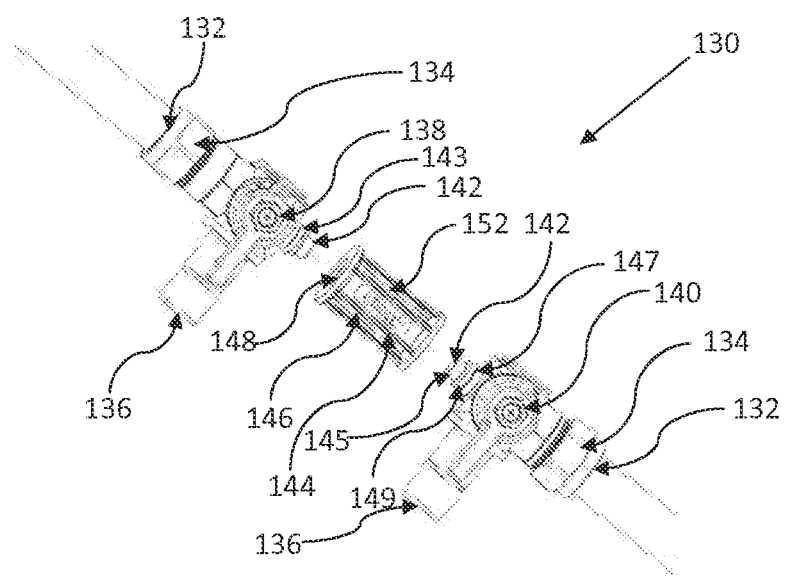
FIG. 9 shows a perspective view of a pipe fitment not forming part of the invention.
Figure 10:
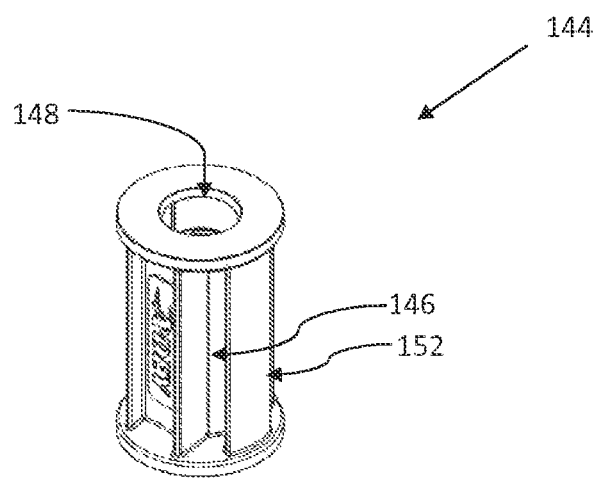
FIG. 10 shows a perspective view of a spacer, being a component part of the pipe fitment of FIG. 9.
Figure 11:
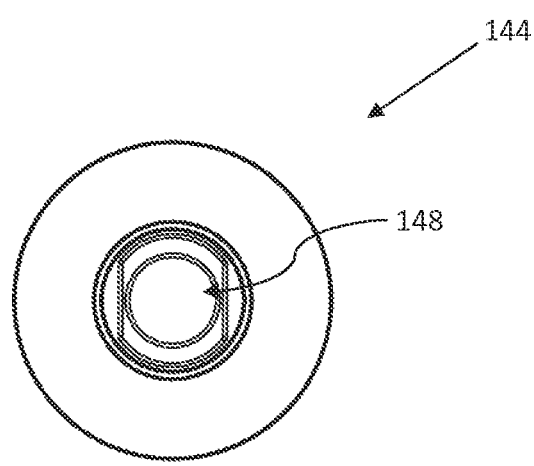
FIG. 11 shows a top plan view of the spacer of FIG. 10.
Figure 12:
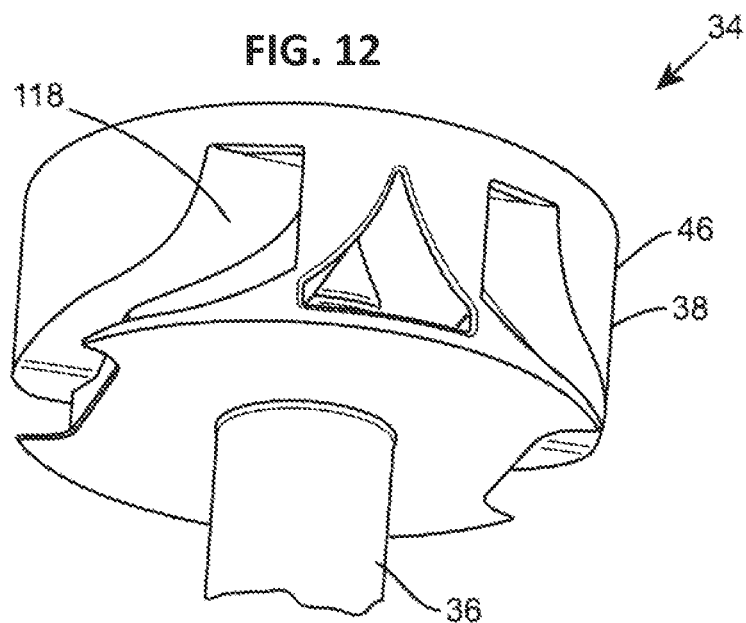
FIG. 12 shows a perspective view of the top part of the insert of FIG. 4.

Referring now to FIGS. 9 to 11, a fitment for fitting the separator device 10 in-line in a central heating circuit is shown generally at 130. The fitment 130 comprises first and second sockets 132 for accepting the open ends of pipes, a screw compression fitting 134 of well-known design on each socket 132 for forming a sealed connection with the pipe ends, and first and second pipe portions 136 fluidly connected respectively to the first and second pipe sockets, for fitting to the Speedfit® connectors 98 in the inlet and outlet 96 on the housing 12 of the separator device 10. A first valve 138 can be operated to break the fluid connection between the first pipe socket 132 and the first pipe portion 136, and a second valve 140 can be operated to break the fluid connection between the second pipe socket 132 and the second pipe portion 136. One of the two sockets 132 has a greater pipe receiving depth than the other, for example, twice the pipe receiving depth.

Plugs 142 are provided on the backs of the pipe sockets 132. The plugs include a circular section 143 adjacent to the back of the pipe socket 132, and a square dog section 145 at the end of each plug 142. A recess 147 is provided around the curved surface of the circular section 143, and an O-ring 149 fits within the recess, protruding beyond the curved surface.

A spacer 144 is provided for fitting between the backs of the first and second pipe sockets 132. The spacer 144 is sized to ensure that, when it is fitted, the pipe portions 136 on the fitment 130 are the same distance apart as the Speedfit® connectors 98 in the sockets 96 on the housing 12 of the separator device 10.

The spacer 144 is formed substantially as a cylinder. Recesses 146 are provided on an outer wall 152 of the spacer 144 to provide torsional rigidity without increased mass. A socket 148 extends through the spacer from the top to the bottom, and is in the shape of a circle with two opposing truncated segments. At either end of the spacer 144, the socket 148 has sections which are circular without truncated segments. The circular end sections of the socket are sized to receive the circular sections 143 of the plugs 142. The circular sections 143 of the plugs 142 will not fit through the parts of the socket 148 having truncated segments, however the square sections 145 of the plugs 142 do fit into the truncated socket sections.

When a plug 142 is inserted into a socket 148, the square end dog section 145 of the plug 142 will be received into the portion of the socket 148 which has truncated segments. Turning forces which act upon one of the compression fittings 134 will therefore be transmitted through the spacer to the other compression fitting 134. By using two spanners, the net torque which is transferred to the inlet and outlet 96 of the separator device 12 is substantially reduced, limiting the possibility of damage. The dog may have a different cross section if desired, such as a hexagon.

When a plug 142 is inserted fully into a socket 148, the O-ring 149 on the plug 142 acts to retain and align the plug 142 in the socket 148, requiring a positive force for removal.

In use, a section of the central heating flow or return pipe is removed. Where some manipulation of the central heating pipe is possible, the fitment 130 may be installed without removing the spacer 144. The socket 132 with greater pipe receiving depth is installed first, and is slid over the end of the pipe until the socket 132 with lesser pipe receiving depth can face the other open end of pipe. The fitment is then slid in the other direction, over the open pipe end.

The spacer 144 may alternatively be removed entirely to allow fitting of the separator device 10 to a non-vertical section of flow or return heating pipe. The pipe portions 136 may be separately fitted into each of the John Guest® Speedfit® connectors 98 and may be rotated through 360° to suit the angular path of the central heating pipe. For the separator device 10 to be most efficient it must be mounted in a vertical orientation with the bleed valve housing 106 uppermost and the drain valve 116 at the lowest point. The most common option is to fit to vertical orientation pipe but by removing spacer 144 the separator device 10 can be installed to a non-vertical cut section of central heating pipe by virtue of the flexibility of fitment 130.

Referring now to FIGS. 15 to 18, a release tool for use with separator device 10 is shown generally at 150. The release tool 150 comprises two circular discs 152, each having a circular aperture at its center, a wall 154 extending from the edge of each disc 152, and a connecting handle member 156 between the discs 152. A circular locking member 158 includes a female threaded section through its center, and a corresponding male threaded section 160 extends perpendicularly from the connecting member 156. The circular locking member 158 is screwed on to the male threaded section 160, the distance between the locking member 158 and the connecting handle member 156 being adjustable by rotating the locking member 158 to move it along the male threaded section 160.

Figure 18:
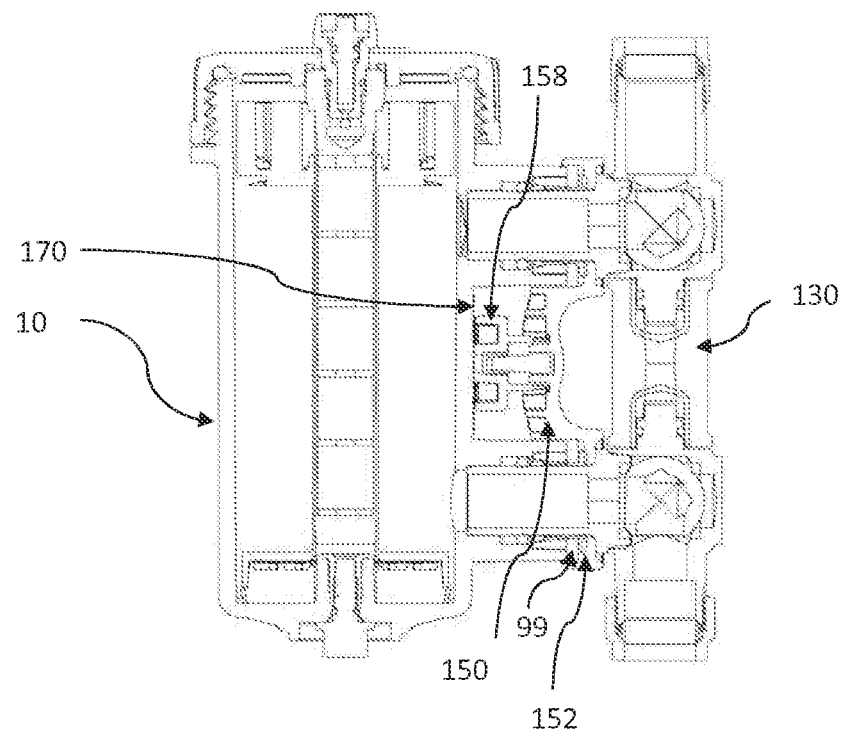
FIG. 18 shows a cut-away view of the release tool of FIG. 15 fitted between the separator device of FIG. 1 and the pipe fitment of FIG. 9, in which the release tool is locked to prevent release.

The John Guest® Speedfit® connectors 98 on the inlet and outlet 96 of the separator device 10 include collets 99, which when pushed towards the body of the separator device 10 allow the separator device 10 to be released from the connected pipe fitment 130. When the separator device is installed, the release tool 150 is placed over the pipe portions 136 of the pipe fitment 130 so that the pipe portions 136 extend through the apertures in the discs 152 of the release tool. John Guest® Speedfit® connectors 98 on the separator device 10 are then engaged with the pipe portions 136 of the fitment 130. The locking member 158 is rotated so that it moves along the male threaded section 160, away from the connecting handle member 156, until it is adjacent to the flat raised section 170 on the curved surface of the body of the separator device 10, as shown in FIG. 18. With the locking member adjacent to the separator device, the Speedfit® connections 98 cannot be disengaged, since the collets 99 are inaccessible.

The flat section 170 allows a tight fit against the locking member, whilst reducing the pressure by increasing the contact area, limiting the possibility of damage.

Figure 17:
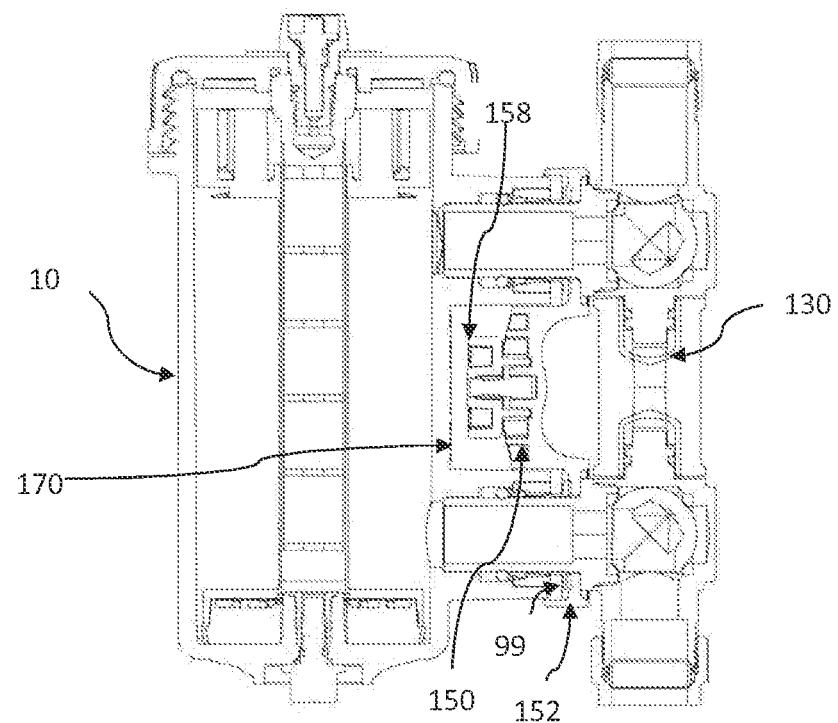
FIG. 17 shows a cut-away view of the release tool of FIG. 15 fitted between the separator device of FIG. 1 and the pipe fitment of FIG. 9, in which the release tool is unlocked to allow release.

When the separator device needs to be removed from the pipe fitment, for example for cleaning, the locking member 158 is rotated so that it moves along the male threaded section 160, towards the connecting handle member 156 and away from the body of the separator device, as shown in FIG. 17. With the locking member 158 adjacent to the connecting handle member 156, the release tool 150 may be moved towards the body of the separator device 10, the discs 152 having bearing surfaces which engage with the collets 99 of the Speedfit® connectors 98 to release the connection.

Figure 15:
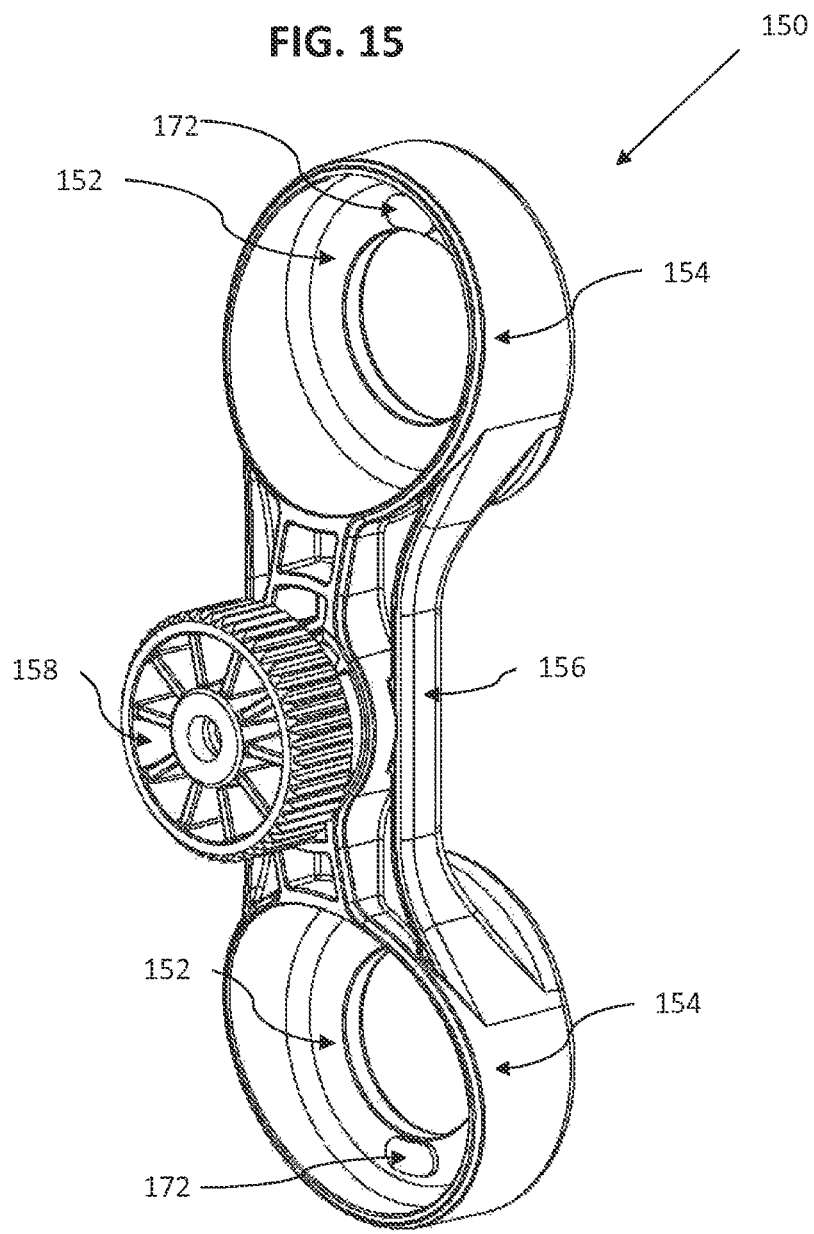
FIG. 15 shows a perspective view of a release tool according to the third aspect of the invention, for use with the separator device of FIG. 1.
Figure 16:
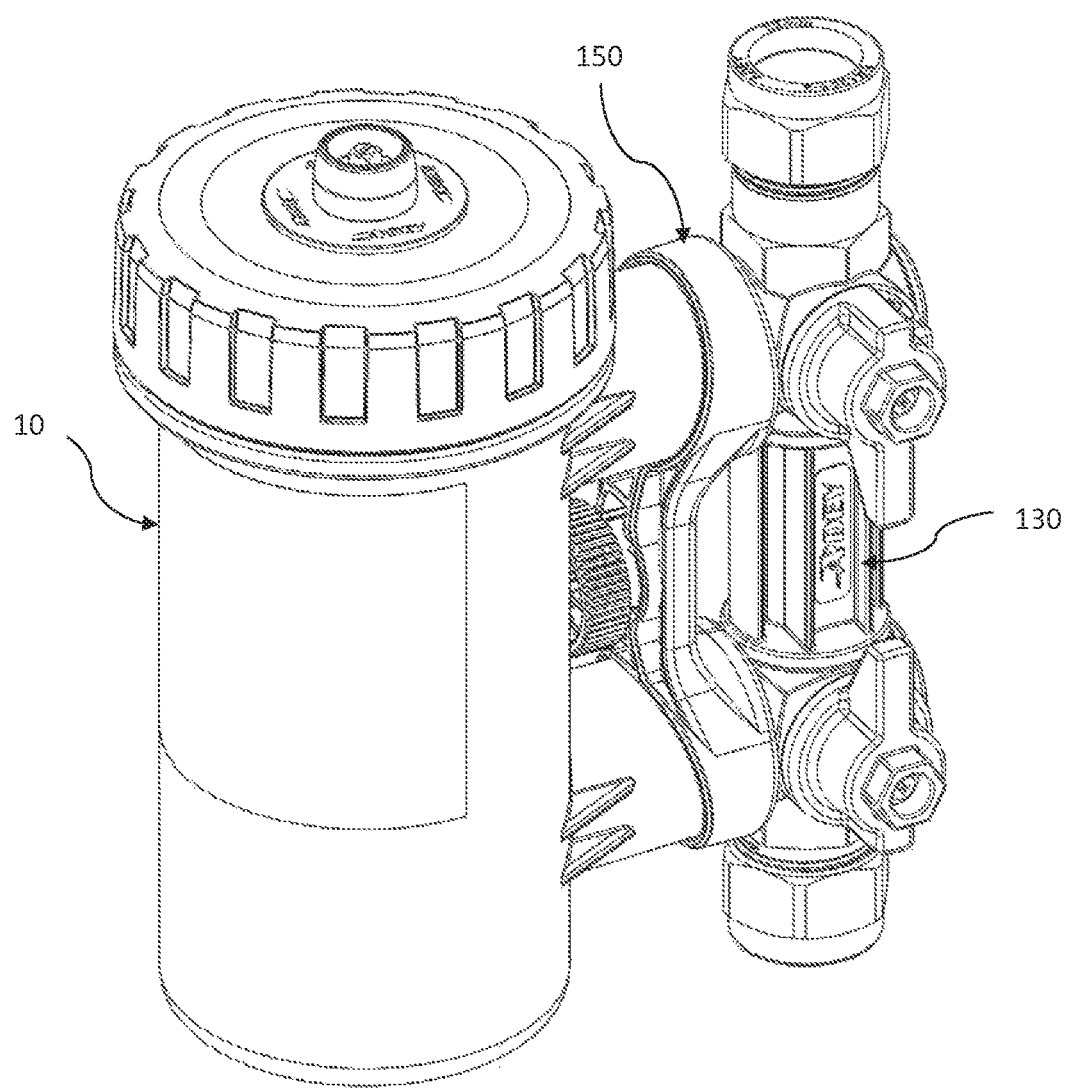
FIG. 16 shows a perspective view of the release tool of FIG. 15, fitted between the separator device of FIG. 1 and the pipe fitment of FIG. 9.

As seen best in FIG. 15, the release tool 150 includes raised areas 172 on outer edges of the bearing areas 152. The raised areas ensure that even force is provided on either side of the collets 99 in use. The release tool 150 is slightly curved and also may deform very slightly in use, the outer edges (furthest from the handle portion) bending away from the direction of the force applied to the handle portion. The raised areas 172 compensate for this, ensuring that the release tool pivots against the outer edges of the collets rather than the inner edges, so that the inner edge pushes into the collet when force is applied, rather than the outer edge moving away from the collet. In this way an even force is applied across opposing sides of the connectors and they release easily.

The release tool allows for secure fitting and yet easy release of the separator device. Because the separator device may easily be completely removed from the pipework, additional flexibility is provided to the installer when the separator device is being initially located. The possibility of fast release means that it is not necessary to provide enough space above the separator device to unscrew the closure portion 16 and remove the removable insert 34 whilst the device is in situ. This allows installation, for example, between the bottom of a boiler and a countertop, where service and cleaning of the separator device would otherwise be impossible.

Figure 19:
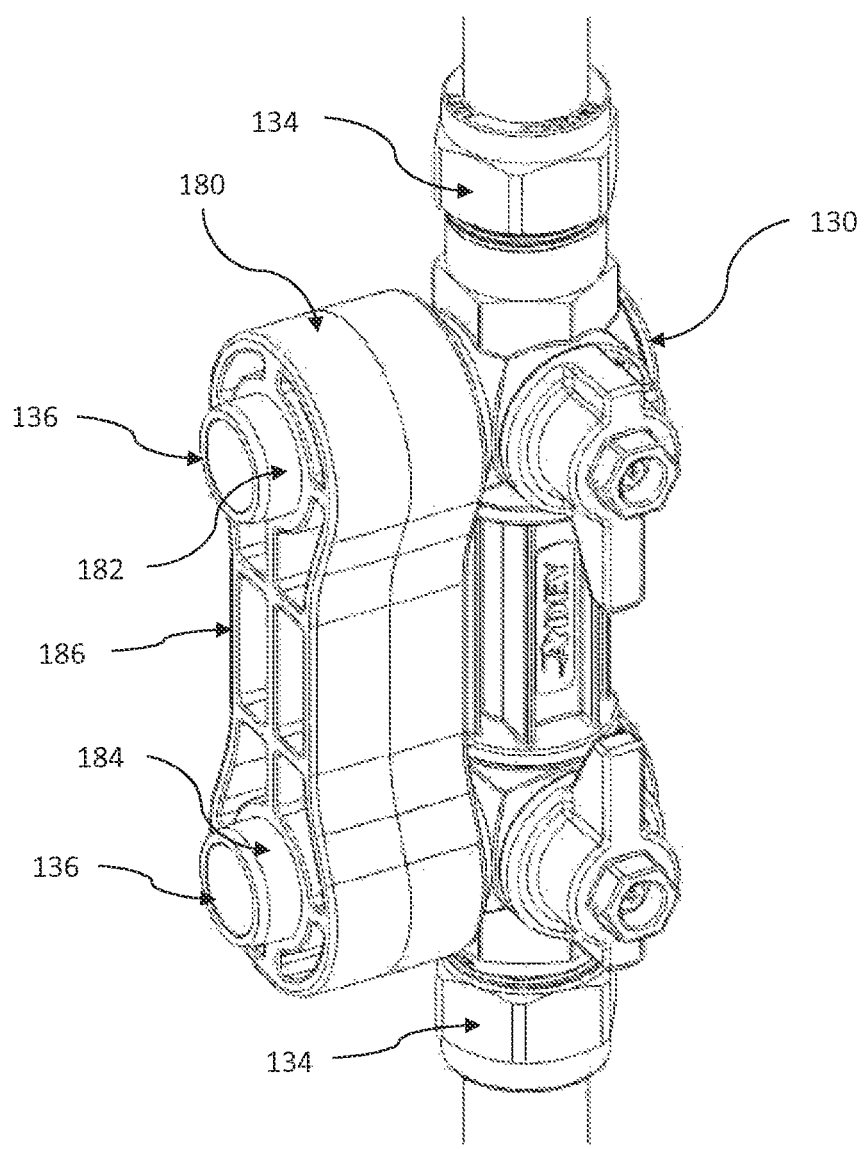
FIG. 19 shows a perspective view of a fitting jig, attached to the pipe fitment of FIG. 9.

Referring now to FIG. 19, a fitting jig is indicated at 180, connected to the pipe fitment 130. The fitting jig comprises a pair of apertures 182, 184 for receiving first and second pipe portions, and a connecting section 186 spacing the apertures 182, 184 a fixed distance apart. The axes of the apertures 182, 184 are parallel and have a depth of between 10 mm and 30 mm, preferably around 25 mm. The apertures are a clearance fit on the first and second pipe portions, and the apertures slide on to the pipe portions, holding them accurately and firmly in line relative to one another. The fitting jig allows easy alignment of the first and second pipe portions 136, so that they are in the correct position for fitting of the separator device 10. If the separator device itself is used for this purpose, there is a danger of damage when torque is applied to the compression fittings 134. Use of the jig avoids this risk.

By virtue of the inlet and outlet connections being in-line, the separator device 10 is easy to fit. Furthermore, the inlet and outlet can be interchanged, i.e. the flow direction can be changed, and the separator will operate effectively with flow in either direction. All of the separating chambers are able to cope with swirl in both directions within the housing. By providing three chambers with counter-rotating flow, filtration is achieved whilst the flow rate is substantially unaffected.

The embodiments described above are provided by way of example only, and various changes and modifications will be apparent to persons skilled in the art without departing from the scope of the present invention as defined by the appended claims.

The invention claimed is:

1. A separator device for removing particles from suspension in a liquid comprising:
a housing, having a first chamber and a second chamber, baffles being provided in the second chamber to slow the flow of liquid within the second chamber for separating small solid particles from the liquid, wherein the second chamber is a separation chamber;
apertures formed in a portion of the housing defining the first chamber, the apertures allowing ingress of liquid into the first chamber and egress of liquid out of the first chamber;
means for setting up a swirl of liquid within the first chamber; apertures enabling flow of liquid from the first chamber to the second chamber and from the second chamber to the first chamber; and
means for directing a flow of liquid within the second chamber, the flow in the second chamber being in substantially the opposite direction to the swirl in the first chamber.

2. The separator device of claim 1, wherein the apertures formed in the portion of the housing defining the first chamber form an inlet and an outlet to the first chamber, wherein flow in the first chamber between the inlet and outlet is substantially unobstructed.

3. The separator device of claim 1, in which the means for directing a flow of liquid within the second chamber sets up a swirl of liquid in the second chamber.

4. The separator device of claim 1, in which a third chamber is provided in the housing, the third chamber being apertured for ingress and egress of fluid from at least one of the first chamber and the second chamber, and means being provided for directing a flow of liquid in the third chamber.

5. The separator device of claim 4, in which the means for directing a flow of liquid in the third chamber sets up a swirl of liquid in the third chamber.

6. The separator device of claim 4, in which the means for directing a flow of liquid in the third chamber causes liquid to flow in the same direction as the flow in the second chamber.

7. The separator device of claim 4, in which the first chamber is disposed between the second and third chambers.

8. The separator device of claim 4, in which the first, second, and third chambers share a single central axis.

9. The separator device of claim 8, in which the means for directing flow of liquid within the second chamber comprise apertures in the chamber having the form of curved slots.

10. The separator device of claim 1, in which the means for directing a flow of liquid in the second chamber reverses the direction of liquid flow upon entry to the second chamber.

11. The separator device of claim 1, in which the means for directing flow of liquid within the second chamber comprise of at least one flow guide extending from a wall of the chamber adjacent to at least one aperture in the chamber wall.

12. The separator device of claim 11, in which the flow guide or flow guides form an angled deflector overhanging each aperture.

13. The separator device of claim 11, in which the flow guide or flow guides extend below the aperture wall, into the chamber in which flow is being directed.

14. The separator device of claim 1, in which the means for directing a flow of liquid within the second chamber sets up flows of liquid in opposing directions.

15. A separator device for removing particles from suspension in a liquid comprising:
a housing, having a first chamber and a second chamber, wherein the second chamber is a separation chamber;
apertures formed in a portion of the housing defining the first chamber, the apertures for allowing ingress of liquid into the first chamber and egress of liquid out of the first chamber;
means for setting up a swirl of liquid within the first chamber; and
apertures enabling flow of liquid from the first chamber to the second chamber and from the second chamber to the first chamber;
the direction of liquid flow being substantially reversed as liquid enters the second chamber, and at least a portion of flow being substantially reversed again within the second chamber.

16. The separator device of claim 15, in which a third chamber is provided, being apertured for ingress and egress of fluid from at least one of the first chamber and the second chamber, and means being provided for setting up a swirl of liquid in the third chamber.

17. The separator device of claim 16, in which the first chamber is disposed between the second and third chambers.

18. The separator device of claim 16, in which the means for setting up a swirl of liquid within at least one of the second chamber and the third chamber comprise apertures in the chamber having the form of curved slots.

19. The separator device of claim 15, in which the means for setting up a swirl of liquid within the second chamber comprise at least one flow guide extending from a wall of the chamber adjacent to at least one aperture in the chamber wall.

20. The separator device of claim 19, in which the flow guide or guides form an angled deflector overhanging each aperture.

21. The separator device of claim 19, in which opposing swirls of liquid are set up in the second chamber.

* * * * *